(12) United States Patent
Osae et al.

(10) Patent No.: US 7,816,453 B2
(45) Date of Patent: *Oct. 19, 2010

(54) ADHESIVE COMPOSITIONS FOR BONDING AND FILLING LARGE ASSEMBLIES

(75) Inventors: Samuel B. Osae, Cary, NC (US); Paul C. Briggs, Chapel Hill, NC (US)

(73) Assignee: IPS Corporation, Compton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/056,342

(22) Filed: Mar. 27, 2008

(65) Prior Publication Data

US 2008/0177004 A1    Jul. 24, 2008

Related U.S. Application Data

(60) Division of application No. 11/646,664, filed on Dec. 28, 2006, which is a division of application No. 10/688,441, filed on Oct. 17, 2003, now abandoned, which is a continuation-in-part of application No. 10/634,316, filed on Aug. 5, 2003, now Pat. No. 6,852,801, which is a division of application No. 09/902,436, filed on Jul. 10, 2001, now Pat. No. 6,602,958.

(51) Int. Cl.
| | |
|---|---|
| C08L 23/00 | (2006.01) |
| C08L 23/04 | (2006.01) |
| C08L 27/04 | (2006.01) |
| C08L 33/00 | (2006.01) |
| C08L 33/02 | (2006.01) |
| C08L 33/14 | (2006.01) |
| C08L 41/00 | (2006.01) |
| C08L 45/00 | (2006.01) |
| C08K 5/00 | (2006.01) |

(52) U.S. Cl. ................ 525/191; 525/210; 525/212; 525/213; 525/217; 525/221; 525/222; 525/232; 525/240; 524/500; 524/515; 524/518; 524/519; 524/521; 524/522; 524/523

(58) Field of Classification Search ............... 525/191, 525/210, 212, 213, 217, 221, 222, 232, 240; 524/500, 515, 518, 519, 521, 522, 523

See application file for complete search history.

(56) References Cited

U.S. PATENT DOCUMENTS

| | | |
|---|---|---|
| 3,321,351 A | 5/1967 | Bader |
| 3,333,025 A | 7/1967 | Bader |
| 3,548,030 A | 12/1970 | Jernigan |
| 3,564,074 A | 2/1971 | Swisher |
| 3,838,093 A | 9/1974 | Owston |
| 3,890,407 A | 6/1975 | Briggs, Jr. |
| 4,038,475 A | 7/1977 | Frauenglass |
| 4,126,504 A | 11/1978 | Wolinski |
| 4,151,219 A | 4/1979 | Brewbaker |
| 4,182,644 A | 1/1980 | Briggs, Jr. |
| 4,197,390 A | 4/1980 | Jackson |
| 4,223,115 A | 9/1980 | Zalucha |
| 4,233,418 A | 11/1980 | Lingier |
| 4,293,665 A | 10/1981 | Zalucha |
| 4,304,709 A | 12/1981 | Salee |
| 4,347,343 A | 8/1982 | Brewbaker |
| 4,374,940 A | 2/1983 | Bhatia |
| 4,467,071 A | 8/1984 | Dawdy |
| 4,472,544 A | 9/1984 | Ochsenbein |
| 4,483,963 A | 11/1984 | Meyer |
| 4,513,108 A | 4/1985 | Jones |
| 4,518,515 A * | 5/1985 | Ott et al. ............. 525/79 |
| 4,536,546 A | 8/1985 | Briggs |
| 4,548,992 A | 10/1985 | Doi |
| 4,714,730 A | 12/1987 | Briggs |
| 4,773,957 A | 9/1988 | Briggs |
| 4,824,919 A | 4/1989 | Baker |
| 4,942,201 A | 7/1990 | Briggs |
| 4,964,938 A | 10/1990 | Bachmann |
| 5,206,288 A | 4/1993 | Gosiewski |
| 5,262,479 A | 11/1993 | Tobing |
| 5,340,901 A | 8/1994 | Wang |
| 5,362,533 A * | 11/1994 | Fukuda et al. ........ 428/36.8 |
| 5,391,608 A | 2/1995 | Mudge |
| 5,548,056 A | 8/1996 | Chung |
| 5,656,345 A | 8/1997 | Strand |
| 5,859,160 A | 1/1999 | Righettini |
| 5,932,638 A | 8/1999 | Righettini |
| 5,935,711 A | 8/1999 | Pocius |
| 5,945,461 A | 8/1999 | Gosiewski |
| 6,203,911 B1 | 3/2001 | Weberg et al. |
| 6,291,593 B1 | 9/2001 | Cheng |
| 6,387,479 B1 | 5/2002 | Hayashi |
| 6,433,091 B1 | 8/2002 | Cheng |
| 6,602,958 B2 | 8/2003 | Briggs |
| 6,852,801 B1 | 2/2005 | Briggs |
| 2007/0142556 A1 * | 6/2007 | Osae et al. ........... 525/192 |
| 2008/0177004 A1 | 7/2008 | Osae et al. |

FOREIGN PATENT DOCUMENTS

| | | |
|---|---|---|
| EP | 0376350 A2 | 7/1990 |
| EP | 0487058 A2 | 5/1992 |
| WO | WO0032688 A1 | 6/2000 |

OTHER PUBLICATIONS

Drake, R.S. and Siebert, A.R., "Reactive Butadiene/Acrylonitrile Liquid and Solid Elastomers: Formulating Acrylic, Anaerobic and Radiation-Curable Adhesive," Adhesive Chemistry, pp. 393-407 (1984).

* cited by examiner

*Primary Examiner*—Nathan M Nutter
(74) *Attorney, Agent, or Firm*—Scott R. Cox

(57) ABSTRACT

Adhesive composition for bonding and filling large assemblies, including a mixture of about 5 percent to about 75 percent by weight of a thermoplastic polymer, about 0.5 percent to about 35 percent by weight of a polyester resin or vinyl ester resin, and about 20 percent to about 80 percent by weight of an alkyl acrylate or methacrylate monomer.

25 Claims, No Drawings

ADHESIVE COMPOSITIONS FOR BONDING AND FILLING LARGE ASSEMBLIES

RELATED U.S. APPLICATION

This application is a divisional application of application Ser. No. 11/646,664, filed on Dec. 28, 2006, which application is a divisional application of application Ser. No. 10/688,441, filed on Oct. 17, 2003, and now abandoned which application is a continuation-in-part of application Ser. No. 10/634,316, filed Aug. 5, 2003 and now U.S. Pat. No. 6,852,801, and which is a divisional application Ser. No. 09/902,436 filed Jul. 10, 2001, now U.S. Pat. No. 6,602,958, which issued on Aug. 5, 2003.

BACKGROUND OF INVENTION

1. Field of Invention

This invention relates to polymerizable vinyl adhesive or filling compositions that are useful for a variety of adhesive, coating, filling, repair and related applications. More particularly, this invention relates to two-part room-temperature curing polymerizable vinyl adhesive compositions comprising mixtures of free-radical polymerizable monomers and additives that generate heat and undergo expansion and contraction during the polymerization process. The improved compositions comprise mixtures of elastomers, thermoplastic resins, acrylate, methacrylate and styrenic monomers, and polyester or vinyl ester resins that can be applied in large masses or thick cross sections without gassing and void formation from the exothermic cure reaction. It also relates to improvements in the ability of adhesives based on the compositions to bond thermoplastic and thermoset materials, and to bond such materials with a reduced tendency to cause "read-through" in the bonded area. It further relates to improvements in the ability of the compositions to cure with a tack-free surface and low residual odor, especially when formulated to have a long open working time applications involving large parts or assemblies. It still further relates to improvements in the physical properties and adhesive bonding capabilities of the modified compositions.

2. Background

Polymerizable vinyl adhesive compositions that are useful for a variety of adhesive, coating, filling, repair and related applications are well known in the art. Prior art compositions include formulations based on acrylate and methacrylate monomers, styrene monomer and styrene derivatives as well as polyester and vinyl ester resins. The compositions are generally liquids or pastes that polymerize and cure when two separately packaged components, one of which contains a polymerization initiator, generally a peroxide, and the other of which contains a promoter, generally an amine, are mixed just prior to use.

A particularly useful group of polymerizable vinyl compositions comprises mixtures of dissolved or dispersed polymers in acrylate or methacrylate monomers. Such compositions can provide a number of performance benefits for adhesive bonding and related applications, including high bond strength, adhesion to a variety of materials with minimal surface preparation, and rapid curing. Methyl methacrylate is a preferred monomer for these adhesives because it is relatively low in cost and provides high strength properties in formulated compositions. This group of polymerizable compositions is recognized by those skilled in the art as being superior in many respects to those based on polyester resins and vinyl ester resins, particularly in terms of their ductility and adhesion to a variety of material surfaces.

Polyester resins generally contain styrene, which is lower in cost than methyl methacrylate. They are widely used in automobile body fillers, polyester marine putties, and other filling, bonding and repair materials. Polyester/styrene compositions are preferred for applications that emphasize the ability to economically fill large voids and gaps with adequate functional performance rather than those that emphasize physical properties and related performance attributes at a premium cost. Thus, one surprising aspect of this invention is the achievement of improvements in the performance of the inventive compositions through the incorporation of polyester resins.

Many of the benefits provided by the inventive compositions are useful for the non-adhesive applications cited above. However, adhesive applications are among the most demanding of those anticipated for such compositions. For this reason, the discussion and examples that follow, and the inventive improvements therein will emphasize adhesive applications, with the understanding that they can readily be extended to the other applications cited.

The growing acceptance of methacrylate adhesives has extended their use to larger and larger assemblies and applications, which has resulted in more demanding application requirements. For example, large fabricated assemblies require adhesives with longer open time. For adhesive applications, open time, working time, and open working time are interchangeable terms that define the elapsed time between the mixing of the separate adhesive components and the attainment of a degree of polymerization or cure that prevents effective bond formation. At the end of the open working time, the adhesive either attains a very high viscosity, forms a skin on the surface, or both, preventing effective wetting for good bond formation. For other applications, this interval is often referred to as the gel time or pot life for the composition, which is the time after mixing at which it becomes too thick or viscous to continue applying it. Conventional and prior art techniques for increasing the open working time of adhesives by retarding the onset of cure or cure rate of the composition with chemical inhibitors or retarders often introduce unwanted negative factors or compromises in the application or performance characteristics of the compositions.

Another factor in the use of adhesives for bonding large assemblies is the size of the gaps between the bonded components. As the size of the parts to be bonded increases, so generally does the size of the gap between the mating parts. This can be a particular problem with open molded fiberglass structures, which are prevalent in the construction of boats, large vehicular assemblies, architectural structures, bridge decks, and other large structures. When traditional polymerizable methacrylate adhesives are applied in such thick gaps, the exothermic reaction of curing and the volatility of the monomer generally cause gassing and the formation of voids in the adhesive bond which lead to unacceptable bond integrity and part performance. The additive techniques described above for increasing open working time can also be used to reduce the exotherm and gassing problem, but the same negative application and performance characteristics generally result. Another technique, also discussed below, is the use of inert fillers to reduce this exothermic effect. However, such fillers often have a negative effect on the strength and durability of the compositions in adhesive applications.

Yet another factor addressed by the inventive compositions, especially in the assembly of boats and vehicles, is a phenomenon referred to as read-through or print-through. This is an appearance problem that can result when an adhesive is used to bond an inner reinforcement, stiffener, bracket or other component to an outer panel or "skin" that has a smooth or glossy finish. In transportation applications, such surfaces are generally referred to as "class A" surfaces. At the end of the curing process, or during post-curing processes, certain adhesives, especially those that undergo exothermic polymerization and which change dimensions because of expansion and contraction during the exotherm and cooling associated with the curing process, can contribute to the formation of surface irregularities on the outer or "show" surface of the bonded part. The irregularity is generally a depression, outline, distortion or other disturbance of the surface that is visible to the eye and which is aesthetically objectionable. The occurrence and severity of the problem generally increases with the thickness of the bond and the overall mass of adhesive involved. The causes of such appearance problems can be complex, including contributions from the specific nature of the bonded substrates. These include part thickness, the state of cure of thermoset parts when bonded, the thermal conductivity and expansion coefficients of the bonded materials, the properties of coatings applied on the parts, and other factors. Irrespective of what other factors may be involved in the development of read-through or print through, it is generally observed that adhesives with less tendency to exotherm and undergo dimensional changes during the curing process have less tendency to contribute to the phenomenon.

A number of techniques have been used in efforts to overcome this problem. These often involve the addition of materials that effectively reduce the proportion of reactive monomer in order to reduce its contribution to dimensional changes, shrinkage and exotherm. These materials include inert liquid plasticizers, which act as diluents, and fillers, which act as extenders and absorb some of the heat of polymerization. A related technique involves the use of hollow, expanding microspheres that increase the volume of the curing mass and help offset the shrinkage. Yet another technique is the use of thermoplastic polymers that phase separate during the polymerization process and create internal voids in the material that offset shrinkage. However, as in the case of the gassing problem noted above, the exclusive addition of these inert components in quantities that are sufficient to effectively reduce read through are generally detrimental to the performance of the adhesives. However, they may be used to advantage in combination with the improvements of the inventive compositions.

As previously noted, the usual method of addressing the open working time issues and the exothermic gassing problem, both of which are related to the rate of the curing reaction, is to reduce the reactivity of the composition by using smaller proportions of polymerization initiators, selecting less reactive initiating species, adding retarding additives or chain transfer agents, or a combination of these techniques. However, as pointed out in U.S. Pat. No. 5,859,160 referenced below, these techniques can allow other, undesirable competing side reactions such as oxygen inhibition to interfere with effective polymerization and bond formation. The disadvantages of such air inhibition, as noted in U.S. Pat. No. 5,932,638 also referenced below, include weakening of the adhesive bond, increased odor resulting from escaping, unreacted monomer, and problems related to tackiness of the surface of the adhesive. The problem is especially acute when low levels of catalytic species and added retarding agents are used to extend the open working time of methacrylate based adhesive compositions to periods of about 45 minutes to one hour or more. The problem is further exacerbated by low ambient application temperatures that further reduce the cure rate, and may prevent completion of the free-radical curing process.

Another well-known technique for retarding the cure rate and thereby extending the available time for application of polymerizable vinyl compositions, including methacrylate adhesives, is the addition of certain substituted styrene monomers such as α-methyl styrene. When the composition is based on methyl methacrylate, styrene as well as substituted styrenes are effective, as disclosed in U.S. Pat. No. 5,656,345.

U.S. Pat. No. 5,859,160 discloses the styrenic monomer technique in greater detail, but provides no specific references or examples of adhesive applications or properties, or effects of the added styrenic monomers on them. It is claimed that the deceleration of the cure rate occurs without adversely effecting completion of cure and the properties of the curable composition after it has cured. The use of the invention in formulating adhesive compositions is suggested. It is well known to those skilled in the art that the addition of styrenic monomers to certain methacrylate compositions, especially when combined with low levels of catalytic species to extend open time and reduce exothermic gassing, can have a negative effect on the cure behavior of adhesives.

U.S. Pat. No. 6,291,593 discloses methacrylate adhesive compositions that contain a retarding additive to extend the open time and/or reduce the peak exotherm temperature upon curing. Zinc compounds such as zinc chloride are preferred.

U.S. Pat. No. 5,932,638 discloses the use of certain para-halogenated aniline derivatives to overcome the problems associated with poor surface cure of adhesive compositions resulting from air inhibition. Compositions containing up to about 10 percent by weight of unsaturated polyester resin are disclosed. The cited improvement in the surface cure is a reduction in the thickness of the uncured surface layer exposed to air from about 0.025 inch to about 0.002 to about 0.003 inches. However, actual commercial experience has shown that even the lesser amounts of uncured adhesive cited can be sufficient to cause serious lingering odor problems. Such problems can occur when, for example, the incompletely cured surface of a squeezed out bead or "fillet" of adhesive is in a confined area such the stringer grid of a boat. The problem can be further exacerbated when the fillet or other uncured adhesive bond area is trimmed or smoothed with a spatula or other device that smears a thin film of the adhesive against an exposed surface such as the boat hull. The resulting thin film of adhesive is especially susceptible to the effects of air inhibition. Trapped vapors can eventually migrate to the enclosed cabin area of the boat and create an objectionable or unacceptable level of odor in spite of the very low levels that are present. This is because the detectable odor threshold level for methyl methacrylate monomer is about 0.5 parts per million or less.

There is clearly a need for improved adhesive compositions that provide extended open working time, the ability to cure in large, thick masses without gassing, to provide fully cured, tack free surfaces with little or no residual odor resulting from unpolymerized monomer, and to cure with reduced read-through effects on the finished outer surfaces of boats, vehicles, and other appearance sensitive assemblies while maintaining or improving the performance of the cured adhesive.

It has now been discovered that the combination of polyester or vinyl ester resins and certain acrylate or methacrylate adhesive compositions provides these needed improvements. In contrast to the technique of adding specific retarding additives detailed above, which entail a risk of negative effects on adhesive properties, the addition of polyester resins can impart multiple benefits which will become apparent in the discussion that follows.

U.S. Pat. No. 5,932,638 discloses the optional inclusion of from 0 to about 10 percent by weight of a polyester resin in methacrylate compositions.

U.S. Pat. No. 5,859,160, also discloses the optional inclusion of from 0 to about 10 percent by weight of an unsaturated polyester resin in methacrylate adhesive compositions.

The '638 patent and the '160 patent cite U.S. Pat. Nos. 3,321,351, 4,223,115, 4,293,665, and 4,467,071, which disclose the incorporation of unsaturated polyester resins in methacrylate adhesive compositions. As in the references cited above, the '115, '665 and '071 patents disclose the optional inclusion of from 0 to about 10 percent by weight of unsaturated polyester resin. Example IV in the each of the '115 and '665 patents, which claims improvements in metal adhesive bond durability through the addition of phosphate ester materials, includes 3 percent by weight of an unsaturated polyester resin.

In all of the above-cited references, the methacrylate composition contains at least about 10 percent, and generally 15-20 percent or more of a polymeric species to provide toughness in the cured composition. Preferred polymers include polychloroprene, chlorosulfonated polyethylene, mixtures of chlorinated polyethylene with sulfonyl chlorides, polybutadiene, butadiene copolymers, and polyacrylate rubbers. No particular preference is stated for selection among these polymers, whether or not an unsaturated polyester resin is present.

U.S. Pat. No. 3,321,351 discloses compositions containing unsaturated polyester resins, vinyl monomers and their polymerizates (specifically methyl methacrylate and polymers thereof, styrene monomer and polymers thereof), polychloroprene rubber and polyvinyl ethers. The specification generally discloses 10-85% vinyl monomer, 0-50% vinyl polymer, 0-80% unsaturated polyester and 0-40% polyvinyl vinyl ethers. In the examples, however, when methyl methacrylate is included in the compositions, and no neoprene is included, no more than 15 percent polyester resin is included. When both methyl methacrylate and neoprene are present, no more than 1 percent unsaturated polyester is included. In no case does the amount of neoprene exceed 3 percent of the composition.

U.S. Pat. No. 4,548,992 discloses methacrylate adhesive compositions containing a modified carboxyl containing nitrile rubber and an alkali metal or amine salt of an unsaturated polyester resin. The carboxyl containing nitrile rubber is modified by reaction with a methacrylated phosphate ester. The free carboxyl groups of the polyester resin are neutralized by a metal compound, ammonia or an amine to create a modified polyester resin containing an ionic bond. The ionic bond-containing polyester resin is said to promote adhesion to oily metal surfaces and to improve the storage stability of the methacrylate adhesive composition.

SUMMARY OF THE INVENTION

The essential feature of this invention is the use of unsaturated polyester resins or vinyl ester resins to modify the curing behavior, bonding capabilities and physical properties of polymerizable acrylate or methacrylate compositions. The acrylate or methacrylate compositions are solutions of thermoplastic or partially thermoplastic polymers or elastomers in acrylate or methacrylate monomers that polymerize when mixed with a catalyst.

The preferred polyester resins and vinyl ester resins are commercial products that are typically supplied as liquids that are catalyzed with peroxides and promoters and used for a variety of applications including laminated and cast parts and structural components, coatings, adhesives and repair materials.

The preferred polymers are synthetic elastomeric and thermoplastic polymers. The preferred monomers are low molecular weight acrylate and methacrylate monomers. The most preferred monomer is methyl methacrylate.

This invention provides compositions that include about 5 percent to about 75 percent of a thermoplastic or partially thermoplastic polymer or elastomer, about 0.5 percent to about 35 percent of an unsaturated polyester resin or vinyl ester resin, and about 20 percent to about 80 percent of an acrylate or methacrylate monomer. The inventive compositions exhibit better control of the exothermic curing and dimensional changes associated with adhesives and filling compositions. As a result, they can be applied in thicker masses and can be used to bond and fill large areas and gaps with greatly reduced tendency to gas or boil, exhibit readthrough or print-through or other effects of reaction exotherm, with freedom from the negative effects of under-curing at the surface or in thin cross-sections or films.

DETAILED DESCRIPTION OF INVENTION

The polyester and vinyl ester resins utilized in this invention are well known to those skilled in the art. The resins and their applications are described in detail in a number of publications, including "Handbook of Composites", second edition, S. T. Peters, Editor, published by Chapman and Hall which is included herein by reference.

Unsaturated polyesters are condensation reaction products of polybasic acids or anhydrides with polyhydric alcohols. After the condensation reaction is completed, the resulting resin, generally a solid or semisolid, is diluted with an unsaturated monomer to establish the desired viscosity, reactivity and end use properties.

Preferred unsaturated monomers include styrene, alpha-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, and the like, and mixtures comprising at least one of the foregoing alkenyl aromatic monomers. Preferred alkenyl aromatic monomers further include styrenes having from 1 to 5 halogen substituents on the aromatic ring, and mixtures comprising at least one such halogenated styrene. The monomer mixture may also contain an acrylate or methacrylate monomer such as methyl methacrylate. The monomer is generally present in an amount of about 30 to about 60 parts per 100 parts resin.

Specific examples of unsaturated polybasic acids that may be used to form the unsaturated polyester resins include maleic acid, fumaric acid, itaconic acid, citraconic acid, chloromaleic acid, nadic acid, tetrahydrophthalic acid, endo-methylenetetrahydrophthalic acid, hexachloro-endo-methylenetetrahydrophthalic acid and other unsaturated di- and polybasic acids and halogenated acids, as well as their corresponding esters and anhydrides. Preferred unsaturated acids include maleic acid and fumaric acid, and their corresponding esters and anhydrides.

Polyfunctional saturated and aromatic acids are employed in conjunction with the polybasic unsaturated acids to reduce the density of the ethylenic unsaturation and provide desired chemical and mechanical properties for specific applications. Examples of saturated and aromatic polybasic acids include succinic acid, adipic acid, sebacic acid, azelaic acid, dodecanedioic acid, eicoic acid, phthalic acid, isophthalic acid, terephthalic acid, cyclohexanedicarboxylic acid (CHDA), and the like, halogenated acids such as tetrabromophthalic acid, as well as their esters and anhydrides. Preferred aromatic polybasic acids include phthalic acid, terephthalic acid and isophthalic acid, and their corresponding esters and anhydrides. Polyester resins that employ them are referred to as "orthophthalic" and "isophthalic" or "ortho" and "iso" resins, respectively.

Examples of useful polyhydric alcohols include ethylene glycol, propylene glycol, 1,2-propanediol, 2-methyl-1,3-propanediol, diethylene glycol, dipropylene glycol, 1,2-butanediol, 1,3-butanediol, 1,4-butanediol, neopentyl glycol, glycerol, triethylene glycol, pentanediol, hexylene glycol, hydrogenated bisphenol A, bisphenol A-alkylene oxide adducts, tetrabromobisphenol A-alkylene oxide adducts, and the like. Preferred polyhydric alcohols include ethylene glycol, diethylene glycol, propylene glycol, dipropylene glycol, 2-methyl-1,3-propane diol, and neopentyl glycol. Triols, when used are employed in very limited quantity relative to diol to control and limit chain branching and its effects on molecular weight and viscosity. Preferred triols include glycerol and trimethylol propane.

More recently, dicyclopentadiene (DCPD) monomer has been used to synthesize polyester resins that can be incorporated in higher proportions in styrene monomer to produce "low styrene" resins. Such resins are generally referred to as "DCPD" resins. They are used to lower the styrene emissions from the processes and facilities that employ them.

Vinyl ester resins are described in a number of U.S. patents, including U.S. Pat. Nos. 3,564,074, 4,151,219, 4,347,343, 4,472,544, 4,483,963, 4,824,919, 3,548,030, and 4,197,390 which are incorporated herein by reference. Vinyl ester resins typically comprise a terminally unsaturated vinyl ester resin, generally derived from a polyepoxide, and at least one copolymerizable monomer, generally styrene. The terminally unsaturated vinyl ester resins are prepared by reacting about equivalent proportions of a polyepoxide, such as a bisphenol A/epichlorohydrin adduct with an unsaturated monocarboxylic acid such as acrylic or methacrylic acid. The resulting resin has terminal, polymerizable unsaturated groups. The resins also may include halogenated polyester and vinyl ester resins.

While any of the above-referenced polyester or vinyl ester resins or mixtures thereof may be used to advantage in the inventive compositions, specific combinations of polyester or vinyl ester resins, methacrylate monomers and polymers can be formulated to provide specific and significant performance benefits and improvements over the prior art. For example, any number of the above described polyester or vinyl ester resins may be used to provide compositions with reduced tendency of the composition to gas or boil when the adhesive cures. This can be achieved with either a relatively short or long open working time. When the working time is relatively short, for example from about 10 to about 30 minutes, the adhesive has the unique advantage of providing relatively fast curing with the ability to fill thick cross sections or voids with reduced exotherm and without gassing or boiling. Fully cured, void-free bonds can be achieved within about 15 to about 60 minutes, respectively, in thicknesses of up to about one and one half inches. Prior art adhesives with similar cure times are prone to gassing and boiling in thicknesses of one-half inch or less.

When the open time is long, for example, from about 45 to about 90 minutes, the adhesive has the ability to cure with a hard, tack-free surface, as well as the unique ability to cure in thin cross sections or in a thin film, without weak bonds from cure retardation and lingering odor resulting from unreacted, air-inhibited monomer. In addition, void-free bonds can be obtained within about 90 minutes to about three hours in thicknesses up to three inches. Prior art adhesives with long open time generally do not cure well in thin cross sections or in thin films, and tend to gas and boil in thicknesses greater than about one inch.

In contrast with the aforementioned technique of employing styrene monomer or substituted styrene monomers alone as a separate additives, the polyester resins provide multiple benefits without negatively impacting the cure of the composition, and in fact even improve the final state of cure of the compositions. Other benefits can include improved adhesion and physical properties such as tensile strength and tensile elongation.

The choice of resin can influence application, curing and performance characteristics to varying degrees depending upon the specific formulation involved. For example, with other variables constant, compositions containing orthophthalic and isophthalic resins generally achieve a better final state of cure than those containing DCPD resins when benzoyl peroxide is used as the catalyst. However, DCPD resins provide compositions with significantly less exotherm and shrinkage or dimensional change than orthophthalic or isophthalic resins. In order to advance the state of cure when a DCPD resin is selected, particular attention must be paid to the selection of peroxide and promoter levels, and the selection of the inhibitor package.

Compositions containing vinyl ester resins or halogenated vinyl ester resins or mixtures thereof tend to exhibit greater exotherm and dimensional change than those containing polyester resins, but their cure speed, ultimate state of cure and heat resistance, defined as the proportion of room temperature strength retained at high temperatures, are superior. If exotherm and dimensional change is not an issue, very strong, fast-curing bonds with low tendency to gas and boil can be obtained with vinyl ester resins.

The resin employed may be either promoted or unpromoted. Many commercial polyester and vinyl ester resins contain amines and/or organometallic compounds as well as inhibitors that are added by the manufacturer to impart a desired level of reactivity when a peroxide initiator is added just prior to use. Such resins are called promoted or pre-promoted resins. Because the resins employed in this invention are additives in reactive methacrylate compositions that have specific catalytic requirements, it may be preferable in some cases that the polyester and vinyl ester resins contain no catalytic species. The inventive modified methacrylate compositions utilizing such non-promoted resins can then be formulated with the desired level of preferred catalytic species for the desired application characteristics.

The unsaturated polyester and vinyl ester resins of this invention are commercially available from a number of U.S. and global suppliers. U.S. suppliers include Alpha Owens Corning (AOC), Ashland Chemical, Cook Composites (CCP), Eastman Chemical, Interplastic Corporation, and Reichhold. Vinyl ester resins are available from AOC, Ashland, Eastman, Interplastic, Reichhold and Dow Chemical. Global suppliers include Dianippon Chemical in Asia and DSM in Europe. The resins are sold under a number of brand names in various markets. The following is a summary of the resins and their brand names from the various domestic suppliers:

| SUPPLIER | RESIN TYPE | TRADE NAMES |
|---|---|---|
| Alpha Owens Corning | Ortho PE, DCPD Isophthalic PE Terephthalic PE Vinyl Ester | Altek ® H300, H500, H800 Pultru, Vipel Pultru, Vipel Hydropel, Vipel |
| Ashland | PE, DCPD, VE | AME, Aropol, Hetron |
| Dow | Vinyl Ester | Derakane |
| Eastman | Ortho/Iso/Tere PE DCPD Vinyl Ester | Verimac |
| Interplastic | PE, Vinyl Ester | CoREZYN |
| Reichhold | Ortho/Iso/Tere/ DCPD Polyester Vinyl Ester | DION, Polylite Hydrex, Atlac, DION |

PE = Polyester, VE = Vinyl Ester

Preferred unsaturated polyester resins of this invention are unsaturated orthophthalic, isophthalic, terephthalic, DCPD halogenated polyester resins and mixtures thereof. Preferred orthophthalic and DCPD resins include the Altek 500 and 800 series from AOC, the Polylite 31000, 32000, 33000 and 44000 series from Reichhold, and similar resins from other manufacturers. Preferred isophthalic resins include Vipel F737 from AOC and similar resins sold under the trade names DION, ATLAC and Polylite from Reichhold. Preferred DCPD resins include the Altek H800 series from AOC and Polylite 44383, 44006 and 44285 from Reichhold.

Resin manufacturers generally produce unpromoted "base" versions of the above polyester resin types and vinyl ester resins that are blended with other resins to obtain a desired set of properties. Within a given family of resins, grades with varying reactivity and flexibility characteristics are made at high solids levels, generally up to about 70 percent.

Most preferred orthophthalic resins are unpromoted, flexibilized, low-to medium reeactivity versions such as Polylite 31008 from Reichhold and Verimac 711-1530 from Eastman. Most preferred isophthalic and terephthalic resins are unpromoted, flexibilized low to medium reactivity versions such as AOC T750-70, Polylite 31830 from Reichhold and Verimac 126-0863 from Eastman. Most preferred DCPD resins are unpromoted base resins such as COREZYN 61AA340 from Interplastics and Polylite 44-006 from Reichhold.

Preferred vinyl ester resins, halogenated vinyl ester resins or mixtures thereof include Derakane 411-350 from Dow, Hetron 922 from Ashland, COREZYN VE8300 from Interplastic, DION and Atlac 9100 from Reichhold and Verimac 785-8430 from Eastman. Most preferred vinyl ester resins include Derakane 411-350 from Dow and DION/Atlac 9100 from Reichhold.

The vinyl ester or polyester resins can be used individually or in combinations to achieve the optimum effects in terms of curing behavior and physical properties of the cured composition. Virtually any combination of composition may be used, but in order to retain the beneficial properties of the methacrylate adhesive composition, the methacrylate portion should comprise at least about 20 percent of the overall mixture. The compositions of the invention preferably encompass a combination of about 0.5 percent to about 35 percent, preferably from about 1 percent to about 25 percent, and most preferably from about 2 percent to about 20 percent of an unsaturated polyester resin, a vinyl ester resin, or a combination thereof.

The preferred polymers of this invention are thermoplastic or partially thermoplastic polymers and elastomers and may be selected from a thermoplastic or partially thermoplastic polymer or elastomer or a blend of two or more thermoplastic or partially thermoplastic polymers, a blend of two or more elastomers, and a blend of one or more elastomers with one or more thermoplastic or partially thermoplastic polymers. As used here, the term partially thermoplastic refers to polymers, elastomers, or elastomer-containing polymers that have some degree of crosslinking in their structure. One example of such a polymer is a core-shell impact modifier wherein the core, which is typically a butadiene based or acrylic based rubber, is crosslinked to some degree to provide the desired impact modifying properties or other specific properties. Another example is Neoprene AG, a polychloroprene elastomer sold by duPont Dow Elastomers. In this case, the polychlorprene, which is normally thermoplastic and soluble, is specifically modified with an agent that imparts light crosslinking to provide unique, gel-like properties that beneficially modify the rheology of solutions or rubber compounds that contain it. Additional examples include elastomeric polymers that are crosslinked to modify them for use as impact modifiers or other property modifiers in formulated rubber, plastic or other resin compositions. Specific examples include Chemigum, a crosslinked butadiene acrylonitrile elastomer, and Sunigum, a crosslinked acrylate terpolymer, both sold by Eliokem. In all cases, the crosslinking that is included to modify the properties of the polymers renders them insoluble or only partially soluble in the monomers of this invention, whereas fully thermoplastic polymers and elastomers are fully or substantially soluble in the monomers.

Preferred thermoplastic, partially thermoplastic, and substantially soluble polymers and elastomers and mixtures thereof include, but are not limited to, diene based polymers including those based on butadiene or isoprene, such as copolymers and multipolymers containing acrylonitrile, styrenic and acrylic monomers; thermoplastic block copolymers, multipolymers and impact modifiers based on butadiene, isoprene, ethylene-propylene and ethylene-butylene in combination with styrene, acrylonitrile and acrylic monomers; acrylonitrile butadiene styrene (ABS) resins and impact modifiers, methacrylate butadiene styrene (MBS) and MABS impact modifiers and polymers, chlorinated polymers such as polychloroprenes, chlorinated polyolefins and copolymers, chlorosulfonated polyethylenes, polyolefins, and copolymers thereof, polyepichlorohydrins and copolymers, vinyl chloride containing polymers and acrylic based elastomers and impact modifiers. The preferred polymers are those which impart toughness and elastic properties and improve adhesion of the compositions to bonded substrates. Other polymers that improve adhesion or other properties but do not impart toughness may be used to advantage in the inventive compositions. Examples include polymers, copolymers and multi polymers of styrene, acrylonitile, vinyl chloride and acrylic monomers. Low molecular weight, liquid reactive and unreactive elastomers and oligomers may also be used to advantage in the compositions of this invention. Examples include liquid vinyl reactive butadiene polymers and copolymers with acrylonitrile and acrylate monomers sold by Noveon and Ricon resins, and any number of other reactive liquid polymers and oligomers sold commercially by Sartomer, Radcure and others.

Most preferred elastomers and polymers include polychloroprenes such as Neoprene AD-5, AD-10 and AG, chlorinated polyethylenes such as Tyrin 3611, 3615 and 4211, and chlorosulfonated polyethylenes such as Hypalon 20, 30, 40 and 48 sold by duPont Dow elastomers, nitrile elastomers such as Nipol 401LL, 1201, DN-4555, and 1401LG, sold by Zeon Chemical, crosslinked nitrile elastomers such as Zealloy 1422 sold by Zeon and Chemigum P-83 sold by Eliokem, liquid nitrile elastomers such as Hycar 1300×33 sold by Noveon, styrene-butadiene-styrene (SBS), styrene-isoprene-styrene (SIS), styrene-ethylene-propylene (SEP) and styrene-ethylene-butadiene-styrene (SEBS) Block copolymers sold by Kraton Polymers, acrylic elastomers such as Hytemp 4051 and 4054 sold by Zeon, ethylene-acrylic elastomers such as Vamac D and G sold by duPont, core-shell impact modifiers such as Paraloid BTA 753 (MBS) sold by Rohm and Haas, Blendex 338 (ABS) sold by GE Plastics, FM-10 (all acrylic) sold by Kaneka, and ethylene-propylene based impact modifiers, such as Royaltuf 372P20 sold by Crompton Chemical.

Preferred monomers are lower molecular weight $C_1$-$C_6$ acrylate and methacrylate monomers. More preferred monomers include methyl methacrylate, ethyl methacrylate, hydroxyethyl methacrylate, propyl methacrylate, hydroxypropyl methacrylate, butyl methacrylate, cyclohexyl methacrylate, methyl acrylate, ethyl acrylate, hydroxyethyl acrylate, propyl acrylate, hydroxypropyl acrylate, butyl acrylate, hexylacrylate, cyclohexyl methacrylate and mixtures thereof. Even more preferred monomers are methyl methacrylate and ethyl methacrylate. The most preferred monomer is methyl methacrylate. Other higher molecular weight monofunctional or polyfunctional acrylate monomers and oligomers may be used in quantities of up to about 25 percent of the composition in order to crosslink the cured compositions or impart certain desirable application and performance characteristics such as reduced odor, improved wetting and adhesion properties for particular substrates, reduced tendency to solvate sensitive plastic surfaces, including incompletely cured polyester resin surfaces, and improved flexibility or other mechanical properties.

A more complete understanding of the specific benefits provided by the various acrylate and methacrylate compositions and polyester and vinyl ester resins will be evident from the examples that follow.

The compositions of this invention encompass a combination of about 5 percent to about 75 percent, preferably about 7 percent to about 60 percent, and most preferably about 10 percent to about 50 percent of a thermoplastic or partially thermoplastic polymer or elastomer, about 0.5 percent to about 35 percent, preferably about 1 percent to about 25 percent, and most preferably about 2 percent to about 20 percent of an unsaturated polyester resin or a vinyl ester resin, and about 20 percent to about 80 percent of at least one acrylate or methacrylate monomer, preferably from about 30 to about 80 percent, and most preferably from about 40 to about 70 percent.

Preferred compositions of this invention encompass a combination of about 5 percent to about 75 percent, preferably about 7 percent to about 60 percent, and most preferably about 10 percent to about 50 percent of a blend of at least two polymers, about 0.5 percent to about 35 percent, preferably about 1 percent to about 30 percent, and most preferably about 2 percent to about 20 percent of an unsaturated polyester resin or a vinyl ester resin, and about 20 percent to about 80 percent of at least one acrylate or methacrylate monomer, preferably from about 30 to about 80 percent, and most preferably from about 40 to about 70 percent.

More preferred compositions encompass a combination of about 5 to about 75 percent, preferably from about 7 percent to about 60 percent, most preferably from about 10 percent to about 50 percent by weight of a blend of at least two elastomeric polymers, or at least one elastomeric polymer and at least one thermoplastic polymer, about 0.5 percent to about 35 percent, preferably about 1 percent to about 25 percent, and most preferably about 2 percent to about 20 percent of an unsaturated polyester resin or a vinyl ester resin, and about 20 percent to about 80 percent of at least one acrylate or methacrylate or monomer, preferably from about 30 to about 80 percent, and most preferably from about 40 to about 70 percent.

In a further preferred embodiment, the compositions of the invention encompass a combination of about 5 to about 75 percent, preferably from about 7 percent to about 60 percent, most preferably from about 10 percent to about 50 percent by weight of a blend of at least one elastomer and at least one elastomer modified thermoplastic polymer or an elastomer-containing core-shell impact modifier, about 0.5 percent to about 35 percent, preferably about 1 percent to about 25 percent, and most preferably about 2 percent to about 20 percent of an unsaturated polyester resin or a vinyl ester resin, and about 20 percent to about 80 percent of at least one methacrylate monomer, preferably from about 30 to about 80 percent, and most preferably from about 40 to about 70 percent.

In a most preferred embodiment, the compositions of the invention encompass a combination of about 5 to about 75 percent, preferably from about 7 percent to about 60 percent, most preferably from about 10 percent to about 50 percent by weight of a blend of polymers that includes at least one chlorinated polymer and at least one nitrile elastomer or thermoplastic acrylonitrile polymer as disclosed in U.S. Pat. No. 6,602,958, about 0.5 percent to about 35 percent, preferably about 1 percent to about 25 percent, and most preferably about 2 percent to about 20 percent of an unsaturated polyester resin or a vinyl ester resin, and about 20 percent to about 80 percent of at least one methacrylate monomer, preferably from about 30 to about 80 percent, and most preferably from about 40 to about 70 percent.

In order to promote adhesion to various substrates, including metallic substrates, the compositions may also contain from 0.01 to about 20 percent, preferably from 0.1 to about 15 percent of a polymerizable organic acid monomer or oligomer. These include vinyl reactive carboxylic acid monomers that are well known to those skilled in the art. Preferred polymerizable carboxylic acid monomers are acrylic acid, methacrylic acid, maleic acid, fumaric acid and itaconic acid. Other preferred polymerizable acid monomers or oligomers include the vinyl functional derivatives of phosphoric acid disclosed in U.S. Pat. Nos. 4,223,115 and 4,293,665 cited earlier. Specific preferred examples are the mixed mono- and di- substituted phosphate esters derived from hydroxyethyl methacrylate, sold under the tradename Light Ester P-1M and P-2M by Kyoeisha Chemical Co., LTD, Japan.

The selection of the acid monomer or oligomer or mixture thereof depends on the anticipated substrate bonding requirements and other effects imparted by the polymerizable acid employed. For example, methacrylic acid is preferred in many instances because it increases the cure speed of the adhesive composition and improves adhesion to mild steel. The partially substituted phosphated esters are preferred when improved adhesion and durability are required on unprepared aluminum and stainless steel substrates. However, the acid functional phosphate esters can retard the cure speed of certain formulations. Maleic acid is shown in U.S. Pat. No. 4,714,730 to enhance adhesion to difficult to bond substrates such as nylon. In some cases, mixtures of acidic monomers and oligomers can be used to advantage when adhesion to a variety of substrates is required. The precise selection and effects of the mixed acids is influenced by the other components in the formulation and the acceptable performance compromises for a given application.

Various viscosity control agents such as organoclays, fumed silica or the like may be added in amounts ranging from about 0.1 to about 10 percent based on the system weight to control the viscosity of the adhesive. Additional fillers may be added in significantly larger amounts to reduce the cost of the adhesive or to modify certain physical properties. In this case, quantity of the filler or extender would be considered separately as an additive to the base polymer and monomer composition as described above. Common particulate fillers or extenders such as clay, talc, calcium carbonate, silica and alumina trihydrate can be added in amounts up to about 50 percent or more of the composition by weight in order to achieve specific economic, application or bonding characteristics. Inorganic or organic microspheres or microballoons may be used to reduce the density and cost of the adhesives, as well as to improve their sanding or finishing characteristics when used as repair materials such as automobile body repair products.

Any number of available and well-known catalyst combinations may be chosen to cause the polymerization and curing of the compositions of the instant invention. Some of the terms used to describe the various components of the curing system (catalysts, initiators, reducing agents, activators, promoters) are often used interchangeably, and thus the terminology used below may differ from other descriptions used in the art. The primary catalytic species for initiating the polymerization of the vinyl monomers of this invention are peroxide or hydroperoxide initiators. Examples are benzoyl peroxide, cumene hydroperoxide, tertiary butyl hydroperoxide, dicumyl peroxide, tertiary butyl peroxyacetate, tertiary butyl perbenzoate, and the like. The peroxide initiators are used in amounts ranging from about 0.01 to about 10 weight percent based on the weight of the adhesive composition. Preferably, the initiators will be used in the amount of about 0.05 to about 5 weight percent.

In order to prevent premature polymerization of methacrylate adhesive compositions, including the inventive compositions, one or more free radical inhibitors or antioxidant stabilizers may be required in the formulation. The selection and use of such additives is well known to those skilled in the art. The methacrylate monomers used in the compositions contain inhibitors, generally phenolic compounds, that are added to the monomers to stabilize them during storage. Many of the polymers used in the formulations contain heat stabilizers that protect the polymers during processing and storage. The polyester resins of the inventive compositions also may contain inhibitors. The most common inhibitors and stabilizers are phenols, quinones and their derivatives, and many can be used interchangeably in the raw materials cited. In some cases, the inhibitors present in these raw materials are sufficient to stabilize the formulated adhesives, and in some cases additional materials may need to be added to assure stability. Because of the variety of raw materials (with in situ inhibitors) that may be chosen, and the variety of catalyst systems that may be selected to prepare a composition, the selection of the complete inhibitor package is generally the final step in the formulating process. The selection is specific to each formulation, beyond the scope of this invention, and generally proprietary to those skilled in the art.

In addition to the free-radical inhibitors or stabilizers, a chelating agent may be used to further stabilize the methacrylate compositions. Chelating agents are used as scavengers for trace metal impurities that can destabilize the reactive methacrylate formulations. The use and function of these additives are disclosed in U.S. Pat. Nos. 4,038,475 and 4,374,940.

A reducing agent is used to induce the room temperature decomposition of the peroxide or hydroperoxide initiator at ambient or room temperature. The most common reducing agents for this purpose are well known to those skilled in the art and include tertiary aromatic amines and aldehyde-amine reaction products. Useful tertiary amines include N,N-dimethylaniline, N,N-dimethyl-p-toluidine, N,N-diethyltoluidine, N,N-bis(2-hydroxyethyl) toluidine and other similar aromatic amines used for this purpose which are well known in the art. Aldehyde-amine reaction products include such compositions as butyraldehyde-aniline and butyraldehyde-butylamine derivatives whose active ingredient is a dihydropyridine (DHP) formed from condensation of three moles of aldehyde with one mole of amine. More recently, DHP-enriched versions of these compositions have been made available. One such material is Reillcat ASY-2, available from Reilly Industries, Inc. This catalyst or initiator system is most often used in combination with a sulfonyl chloride compound and a hydroperoxide as described in U.S. Pat. Nos. 3,890,407 and 4,182,644. The reducing agents are employed in amounts of up to about 15 weight percent based on the weight of the adhesive. Preferred amounts are 0.01 to about 5 percent.

Transition metal salts, including organometallic compounds such as cobalt, nickel, manganese or iron naphthenate, copper octoate, copper acetylacetonate, iron hexoate, or iron propionate, and other well-known metallic compounds act as promoters for the inventive polymerizable compositions. Promoters, whose effect varies greatly from system to system are used in amounts up to about 1-2 weight percent, preferably about 1 part per million to about 0.5 weight percent. Most preferred amounts range from about 5 parts per million to about 0.5 percent by weight. Metallic promoters may be used with certain peroxide initiators as the primary initiating species or in combination with tertiary amine or amine-aldehyde reducing agents to enhance the rate of polymerization.

The most preferred free radical initiation systems comprise (1) a tertiary amine reacting with benzoyl peroxide or another peroxide, (2) a DHP derivative in combination with a sulfonyl chloride compound and a hydroperoxide or another peroxide or (3) an organometallic compound such as cobalt naphthenate in combination with a hydroperoxide, all three combinations being capable of inducing the free-radical curing process at room temperature. Combinations of amine or amine aldehyde and metallic species may be used to advantage in any of the above systems. The precise selection and partitioning of the initiating and inhibiting components for a given composition depend on its specific intended application, subject to the formulating principles well known to those skilled in the art.

The adhesive compositions of the invention are characterized by their ability to polymerize in large masses or thick cross sections without forming voids, and their ability to cure with a tack-free surface or in thin films with low residual odor, especially when formulated to have a long open working time applications involving large parts or assemblies. The compositions are also capable of curing in thick bonds or relatively large masses without exhibiting objectionable read-through or print-through on exposed cosmetic surfaces. They further exhibit improved physical properties and adhesive bonding capabilities. Such improvements include the attainment of higher tensile strength without sacrificing tensile elongation, and the capability to bond a variety of composite materials, including certain difficult to bond composites with or without preparation of the surface prior to bonding, as well as a variety of other materials alone or in combination.

The compositions of this invention have been developed primarily to improve the properties of adhesives. However, the improvements thereby discovered make these products more useful than previous products of their class for repair materials, coatings, bulk casting and any number of other applications beyond adhesives.

EXAMPLES

Materials and Components Utilized in Examples

| Trade name or Designation | Description or Function | Source or Supplier |
|---|---|---|
| Neoprene | Polychloroprene elastomer | DuPont Dow Elastomers |
| Nipol ® | Nitrile elastomer | Zeon Chemicals |
| MMA | Methyl methacrylate monomer | Lucite |
| PARALOID ® BTA 753 | MBS impact modifier | Rohm & Haas Co. |
| MAA | Methacrylic acid monomer | Lucite |
| DMPT | N,N-Dimethyl-p-toluidine | First Chemical |
| HET | Hydroxyethyl toluidine | Bayer AG |
| 55% BPO Paste | Benzoyl peroxide (55%) in proprietary plasticizer mixture | Elf Atochem Akzo Nobel |
| Derakane ® | Vinyl ester (VE) resin | Dow Chemical |
| Vamac ® | Ethylene acrylic elastomer | duPont |
| LMA | Lauryl methacrylate monomer | Sartomer |
| Tyrin ® | Chlorinated polyethylene | DuPont Dow Elastomers |
| Hycar ® | Reactive liquid BD/AN polymer | Noveon, Inc. |
| Kraton ® | Styrene/butadiene block copolymer | Kraton Polymers |
| HyTemp ® | Polyacrylate elastomer | Zeon Chemicals |
| Hypalon ® | Chlorosulfonated polyethylene | DuPont Dow Elastomers |
| NOVA NAS-30 | Styrene acrylic copolymer | NOVA Chemicals |
| Chemigum ® | Crosslinked nitrile rubber | Eliochem |
| Hycar ® | Liquid nitrile polymer | Noveon |
| Reillcat ™ ASY-2 | Dihydropyridine derivative | Reilly Industries, Inc. |
| Luperox ® CU 90 | Cumene hydroperoxide (CHP) | Elf Atochem |
| MEKP | Methyl ethyl ketone peroxide | Norac |
| EDTA Solution | 5% solutiion of tetrasodium ethylenediamine tetraacetate hydrate in 50% aqueous ethanol | Aldrich (Na$_4$EDTA•H$_2$O) |
| Light Ester | Mixed methacryloyloxyethyl phosphate ester | Kyoeisha Chemical Co. |
| HP 1310 | Acrylic oligomer | Hehr International Polymers |

Preparation of Adhesive Compositions

Unless otherwise indicated, the following procedure was used, employing techniques well known in the art, to prepare the experimental adhesives:

Readily soluble or dispersible elastomers and resins were dissolved in methyl methacrylate (MMA) monomer in a jar or metal can on a laboratory roll mill to form stock solutions. The proportions of polymer and monomer were selected to provide a convenient working viscosity to allow the addition and blending of successive formulation ingredients. Typical solution concentrations in MMA of 15-35 percent by weight of polymer were selected to provide final solution viscosities ranging from about 50,000 to 500,000 cps. It is generally preferable to prepare the stock solutions in the higher concentration and viscosity range in order to be able to make final viscosity adjustments by diluting the finished adhesive with MMA monomer. The polymer and monomer were rolled until all of the polymer was dissolved and no lumps or particles of undissolved material were present.

Experimental adhesives were prepared in plastic beakers in quantities ranging from about 100-600 grams of finished adhesive. Sufficient stock solution or a mixture of stock solutions was added to the beaker in the quantity required to provide the desired proportion of elastomer in the finished adhesive.

When powdered impact modifiers were added to the formulations, they were added to the polymer in monomer solution along with any other non-catalytic liquid ingredients and mixed with a high shear laboratory mixer until a uniform, sometimes grainy paste consistency was achieved. The impact modifiers do not dissolve in the mixture, but rather swell to give the adhesive a gel-like consistency. Generally, two to four hours is required for the impact modifier to swell and soften sufficiently to be fully dispersed in the mixture. At this time, the adhesive is mixed a second time under high shear to form a smooth paste. At the end of the second mix, the remaining ingredients are added and thoroughly mixed into the adhesive. Adhesives formulated with no impact modifier were prepared by adding the remaining ingredients directly to the mixture of stock elastomer solutions and thoroughly mixing to form the finished adhesive.

Final viscosity adjustments were made by adding with MMA monomer to reduce viscosity, or fumed silica or additional impact modifier to increase viscosity, as required.

Adhesive Evaluation Tests and Methods

Measurement of Exotherm Time and Temperature

The peroxide- and amine-containing adhesive components were mixed in the proportions specified in each example. The mixed sample was degassed in a vacuum desiccator to remove entrapped air and placed in a draft-free, clear plastic temperature regulated test chamber maintained at 750 F+/−10 F. A thermocouple wire attached to an exotherm recorder was inserted into the center of the mass of adhesive to record the peak temperature attained and the time to reach peak temperature.

Cure Characteristics of Molded Thick Castings

In order to simulate thick bond cure characteristics, test molds were prepared from adhesively bonded 0.25 inch thick polypropylene sheet to provide a rectangular cavity to form a test casting with dimensions of 8 inches (length) by 2 inches (width) by 1.5 inch (height). A mass of adhesive (approximately 500-600 grams, depending on specific gravity) was mixed and degassed as noted above and transferred to the test mold using a spatula to pack the mold and smooth the top exposed surface even with the top of the mold. The adhesive mass was allowed to cure, and the appearance and condition of the cured casting was observed and recorded.

The presence or absence of voids resulting from gassing or boiling was noted. An arbitrary scale of 1 to 4 was used to rank the formulations, with value of 1 representing essentially no gassing or "boiling" within the casting or at the surface, and 4 representing excessive "boiling" of the mass and gaseous expansion of the mass and formation of surface voids. The intermediate values represent increasing degrees of internal and surface void formation during cure.

In order to assess the effectiveness of curing, the hardness of the casting surface and center (measured in the center of a vertical cut through the midpoint of the bead) was measured using a Shore D durometer.

Adhesive Bond Strength

Adhesive bonds with open molded fiberglass reinforced polyester test coupons were prepared, tested and the results reported according to ASTM method D5868. The bonds were shimmed to provide a nominal thickness of 0.125 inch. Metal bonds were tested according to ASTM D1002 using a bond thickness of 0.010 inch.

When reporting lap shear bond strength results, the following abbreviations are used throughout the examples for the corresponding failure modes:

AF: ADHESIVE FAILURE. The adhesive cleanly separates from the substrate surface.
CF: COHESIVE FAILURE. Failure occurs in the adhesive layer, leaving a distinct layer of adhesive on each substrate surface.
TLCF: THIN LAYER COHESIVE FAILURE. The failure appears to be adhesive in nature, with the bulk of the adhesive on one surface and a thin residue of adhesive on the other.
FT or DL: FIBER TEARING OR DELAMINATION of composite substrates.
SF: Fracture failure and separation of the composite substrate at the adhesive bondline, with no bond separation.

Tensile Properties of the Bulk Adhesives

Bulk stress-strain properties of the adhesives were measured according to ASTM test method D638. Test specimens were prepared by mixing a sufficient quantity of adhesive to prepare a uniformly flat film of adhesive approximately 6 to 7 inches in diameter and approximately 0.0625 inches thick. The adhesive components were combined in the specified ratios by simple hand mixing in a beaker. After the adhesive was thoroughly mixed, the beaker was placed in a vacuum chamber and vacuum was applied intermittently to remove air until the last one or two applications of vacuum did not produce additional frothing or expansion. The adhesive was then transferred to one of two glass or plastic plates approximately 12 inches in diameter with a similar sized layer of Mylar release film on top of it. The adhesive was placed in the center of the film, and a mating Mylar film and plate were placed over the adhesive and pressed down uniformly to spread the film. Metal shims were placed around the perimeter of the plates to establish the desired film thickness.

After the films were cured, the plates were removed. Test dumbbells were cut from the films as specified in the test method, taking care to cut the specimens from the most void-free section of the film. The films were allowed to cure overnight at ambient temperature followed by a thermal postcure at 82° C. for one hour prior to cutting the dumbbells. Each test number is the average of five individual test specimens.

Examples 1-2

Examples 1 and 2 are comparative examples for inventive examples 3-7 and 8-12, respectively. They illustrate that when the respective inventive examples are formulated without the addition of a vinyl ester resin, they undergo significant gassing and boiling, even though they effectively bond open molded FRP composite in normally thin bonded (0.125 inch) cross sections.

TABLE 1

| EXAMPLE | 1 | 2 |
|---|---|---|
| MMA Monomer | 68.60 | 65.60 |
| Neoprene AD-10 | 20.00 | — |
| Nipol DN 4555 | — | 10.00 |
| BTA 753 | — | 18.00 |
| Lauryl Methacrylate | 5.00 | 5.00 |
| HET | 0.40 | 0.40 |
| Methacrylic Acid | 1.00 | 1.00 |
| Dibutyl Phthalate | 2.00 | — |
| Dow Derakane Vinyl Ester Resin | — | — |
| Fumed Silica | 3.00 | 3.00 |
| 55% BPO Paste | 1.80 | 1.80 |
| RESULTS Peak Exotherm 39-Gram Mass | | |
| Time to peak, min. | 30.3 | 44.4 |
| Temperature, ° F. | 288 | 275 |
| Thick Cast Bead Cure Observations 8 in x 2 in x 1.5 in Qualitative Cure Rank (1 = Best, 4 = Worst) | | |
| Surface Boil | Excessive | Yes |
| Surface Boil Rank | 4 | 3 |
| Hardness, Shore D | not tested | 30-35 (porous) |
| Center of Bead | n.t. | 50-55 (porous) |
| Lap Shear Strength, PSI | | |
| Open Molded FRP | n.t. | 569 |
| Failure Mode | n.t. | 100% FT |

Examples 3-7

Examples 3-7 illustrate the effectiveness of a preferred vinyl ester resin in improving the curing performance of methacrylate formulations containing a range of elastomeric polymers. Unlike the Comparative Example 1, the inventive compositions do not boil or gas to cause expansion and undesirable voids in the thick cast bead that simulates a thick bonded cross section.

TABLE 2

| EXAMPLE | 3 | 4 | 5 | 6 | 7 |
|---|---|---|---|---|---|
| MMA Monomer | 58.60 | 58.60 | 58.60 | 58.60 | 58.60 |
| Nipol DN 4555 | 20.00 | — | — | — | — |
| Vamac D | — | 20.00 | — | — | — |
| Kraton D 1102 | — | — | 20.00 | — | — |
| Neoprene AD-10 | — | — | — | 20.00 | — |
| Tyrin 3615P | — | — | — | — | 12.00 |
| BTA 753 | — | — | — | — | 8.00 |
| Lauryl Methacrylate | 5.00 | 5.00 | 5.00 | 5.00 | 5.00 |
| HET | 0.40 | 0.40 | 0.40 | 0.40 | 0.40 |
| MAA | 1.00 | 1.00 | 1.00 | 1.00 | 1.00 |
| DBP | 2.00 | 2.00 | 2.00 | 2.00 | 2.00 |
| Dow Derakane VE Resin 411-350 | 10.00 | 10.00 | 10.00 | 10.00 | 10.00 |
| Fumed Silica | 3.00 | 3.00 | 3.00 | 3.00 | 3.00 |
| 55% BPO Paste | 1.80 | 1.80 | 1.80 | 1.80 | 1.80 |
| RESULTS Peak Exotherm 39 Gram Mass | | | | | |
| Min. to peak | 62.5 | 9.5 | 24.2 | 23.5 | 24.8 |
| Temperature, °F. | 253 | 303 | 319 | 317 | 304 |
| Thick Cast Bead Cure Observations 8 in × 2 in × 1.5 in Qualitative Cure Rank (1 = Best, 4 = Worst) | | | | | |
| Surface Boil | None | None | None | None | None |
| Surface Boil Rank | 4 | 1 | 1 | 1 | 1 |
| Hardness, Shore D | 10-15 | 60-70 | 60-65 | 50-55 | 45-50 |
| Center of Bead | 25-30 | 65-77 | 70-75 | 65-70 | 65-70 |
| Lap Shear Strength, PSI | | | | | |
| Open Molded FRP | 580 | 755 | 715 | 955 | 820 |
| Failure Mode | 100% FT | 100% FT | 100% FT | 100% FT | 100% FT |

It is noteworthy that example 3, which contains a nitrile elastomer, did not cure as effectively as the other examples in this series. This is believed to be the result of the antioxidant type and or level employed in the elastomer as supplied by the manufacturer. As noted in the specification and the examples that follow, adjustments in the type or level of amine promoter, or in the level of BPO paste can be used to influence the curing behavior of individual compositions.

Examples 8-12

Examples 8-12 illustrate that alternative catalyst systems can be used effectively to take advantage of the modification of the curing behavior of the inventive compositions. A preferred vinyl ester resin and a preferred DCPD resin are used to illustrate this effect in these examples.

TABLE 3

| EXAMPLE | 8 | 9 | 10 | 11 | 12 |
|---|---|---|---|---|---|
| MMA Monomer | 55.60 | 55.60 | 55.25 | 55.00 | 55.00 |
| Nipol DN 4555 | 10.00 | 10.00 | 10.00 | 7.50 | 7.50 |
| Hypalon 30 | — | — | — | 5.00 | 5.00 |
| Lauryl Methacrylate | 5.00 | 5.00 | 5.00 | 5.00 | 5.00 |
| BTA 753 | 18.00 | 18.00 | 18.00 | 16.00 | 16.00 |
| MAA | 1.00 | 1.00 | 1.00 | 1.00 | 1.00 |
| HET | 0.40 | — | — | — | — |
| DMPT | — | 0.40 | — | — | — |
| CHP | — | — | 0.50 | 0.50 | 0.50 |
| p-Toluene sulfonyl chloride | — | — | 1.00 | — | — |
| Dow Derakane VE Resin 411-350 | 10.00 | 10.00 | 10.00 | 10.00 | — |
| Reichhold 44-006 DCPD Resin | — | — | — | — | 10.00 |
| 55% BPO Paste | 1.80 | 1.80 | — | — | — |
| Reillcat ASY-2 | — | — | 1.00 | 1.00 | 1.00 |

TABLE 3-continued

| EXAMPLE | 8 | 9 | 10 | 11 | 12 |
|---|---|---|---|---|---|
| RESULTS Peak Exotherm 39 Gram Mass | | | | | |
| Min. to peak | 33.6 | 46.3 | 73.4 | 35.7 | 56.8 |
| Temperature, °F. | 269 | 227 | 244 | 311 | 317 |
| Thick Cast Bead Cure Observations 8 in × 2 in × 1.5 in Qualitative Cure Rank (1 = Best, 4 = Worst) | | | | | |
| Surface Boil | None | None | None | None | None |
| Surface Boil Rank | 1 | 1 | 1 | 1 | 1 |
| Hardness, Shore D | 50-55 | 20 | 65-70 | 70-75 | 60-65 |
| Center of Bead | 60-70 | 25 | 70-75 | 70-75 | 65-70 |
| Lap Shear Strength, PSI | | | | | |
| Open Molded FRP | 490 | 555 | 465 | 455 | 610 |
| Failure Mode | 100% FT | 100% FT | 100% FT | 100% FT | 100% FT |

Examples 8 and 9 illustrate that with other variables constant, HET can be more effective than DMT in combination with BPO in promoting full cure of a specific composition as measured by hardness of the cured composition. Examples 10-12 illustrate that a preferred vinyl ester resin and a preferred DCPD resin can be used to very effectively and beneficially modify the curing behavior of compositions that employ the chlorosulfonated polyethylene/sulfonyl chloride/DHP cure system. It is well known to those skilled in the art that such cure systems are highly reactive and are difficult to control with respect to boiling and gassing in other than very thin bonds or small masses.

Examples 13-17

Examples 13-17 illustrate the effects of four different and preferred modifier resins on the curing properties of a specific and compositionally constant methacrylate formulation compared with a comparative formulation that contains no modifier resin.

TABLE 4

(Comparative)

| EXAMPLE | 13 | 14 | 15 | 16 | 17 |
|---|---|---|---|---|---|
| MMA Monomer | 50.00 | 50.00 | 50.00 | 50.00 | 50.00 |
| Nipol DN 4555 | 7.50 | 7.50 | 7.50 | 12.00 | 12.00 |
| Nova NAS 30 | 4.80 | 4.80 | 4.80 | 4.80 | 4.80 |
| LMA | 1.50 | 1.50 | 1.50 | 1.50 | 1.50 |
| HET | 0.39 | 0.39 | 0.39 | 0.39 | 0.39 |
| 1,4-NQ | 0.003 | 0.003 | 0.003 | 0.003 | 0.003 |
| MAA | 0.75 | 0.75 | 0.75 | 0.75 | 0.75 |
| DBP | 1.00 | 1.00 | 1.00 | 1.00 | 1.00 |
| BTA 753 | 20.38 | 20.38 | 20.38 | 20.38 | 20.38 |
| Fumed Silica | 2.20 | 2.20 | 2.20 | 2.20 | 2.20 |
| Paraffin Wax | 0.50 | 0.50 | 0.50 | 0.50 | 0.50 |
| Eastman 711-1530 Flex Ortho Resin | — | 10.00 | — | — | — |
| Eastman 126-0863 Flex ISO Resin | — | — | 10.00 | — | — |
| Reichhold 44-006 DCPD Resin | — | — | — | 10.00 | — |

TABLE 4-continued (Comparative)

| EXAMPLE | 13 | 14 | 15 | 16 | 17 |
|---|---|---|---|---|---|
| Dow Derakane VE Resin 411-350 | — | — | — | — | 10.00 |
| 55% BPO Paste | 1.80 | 1.80 | 1.80 | 1.80 | 1.80 |
| RESULTS Peak Exotherm 39 Gram Mass | | | | | |
| Min. to peak | 45.2 | 46 | 46 | 240 | 26 |
| Temperature, °F. | 280 | 254 | 256 | 199 | 289 |
| Thick Cast Bead Cure Observations 8 in × 2 in × 1.5 in Qualitative Cure Rank (1 = Best, 4 = Worst) | | | | | |
| Surface Boil | Yes | None | None | None | None |
| Surface Boil Rank | 3 | 1 | 1 | 1 | 1 |
| Hardness, Shore D (Surface only) | porous | 55-60 | 60-62 | 0-10 | 60-63 |

Examples 14 and 15 illustrate that the preferred orthophthalic and isophthalic resins provide similar reactivity as measured by the time to peak exotherm and peak exotherm temperatures. Examples 16 and 17 illustrate that, relative to the orthophthalic and isophthalic resins, the preferred DCPD resin imparts much lower reactivity and the preferred vinyl ester resin provides much higher reactivity as measured by time to peak exotherm and peak exotherm temperature. As noted in the specification and in the other examples the reactivity of examples 16 and 17 would be readily adjusted with appropriate changes in the amount or type of initiator and promoter.

Examples 18-19

Examples 18-19 demonstrate the formulation of an adhesive for bonding Class A fiberglass panels without read-through by incorporating a flexible polyester base resin in the composition.

In order to demonstrate the bonding of a metal bracket to a fiberglass panel, a 1 inch by 4 inch by 0.062 inch aluminum strip was bonded to the rough side a 4 inch by 4 inch by 0.125 inch fiberglass panel with a class A show surface using a 20 grams mass of adhesive. Spacers were used to shim the bond at a thickness of ⅜ inch. The adhesive was allowed to complete the cure cycle to peak exotherm followed by cooling to ambient temperature, with the results as noted at the end of Table 5.

TABLE 5

| EXAMPLE | 18 | 19 |
|---|---|---|
| MMA Monomer | 57.00 | 64.60 |
| Hycar 1300X33 | 2.00 | 2.00 |
| Tyrin 3615P | 12.50 | 12.50 |
| BTA 753 | 18.00 | 18.00 |
| HET | — | 0.40 |
| DMPT | 0.50 | — |
| Methacrylic Acid | 2.50 | 2.50 |
| Flexible Orthophthalic Polyester Base Resin | 7.50 | — |
| 55% BPO Paste | 1.80 | 1.80 |
| RESULTS Peak Exotherm 20 Gram Mass | | |
| Time to peak, min. | 20.3 | 16.8 |
| Temperature, ° F. | 251 | 282 |
| Print-Through | None observed | Print-through visible on show surface |

The comparative print through was observed by the casual visual technique that is traditionally used by those skilled in the art. The bonded assembly is positioned with the show surface perpendicular to a strong light source such as a fluorescent light fixture, and viewed at an oblique, nearly parallel angle. Under such conditions, the presence or absence of print through is readily apparent.

Examples 20-21

Examples 20 illustrates an improved formulation that provides an adhesive with long open time that does not boil in a thick bead, and provides full cure without softness or tackiness or lingering odor from unreacted monomer in a thin film. Example 20 is an inventive composition that contains a flexible polyester resin. Example 21 is a comparative example that utilizes vinyl toluene to provide extended open time. The examples illustrate that the inventive composition does not exhibit boiling when applied in a thick (1 inch) bead, yet cures to a hard state in a thin (0.10 inch) film. The comparative example (formulated for slow cure) does not exhibit boiling in a thick bead, but it does not effectively cure in the thin film as illustrated by the finger hardness test. Importantly, the inventive example has significantly longer open working time than the comparative example, yet cures fully with a lower peak exotherm temperature. When formulated for faster curing, the inventive example does not boil, but the comparative example does.

Comparison of examples 20B and 21B illustrates a significant improvement in the tensile strength and elongation of the inventive composition containing the polyester resin.

TABLE 6

| EXAMPLE | 20 | 21 |
|---|---|---|
| MMA Monomer | 50.00 | 56.50 |
| Lauryl Methacrylate | 1.50 | 4.00 |
| Nipol DN 4555 | 7.50 | 7.50 |

TABLE 6-continued

| EXAMPLE | 20 | 21 |
|---|---|---|
| NAS-30 | 4.80 | 4.80 |
| Paraloid BTA 753 | 20.40 | 18.00 |
| Flexible Orthophthalic Polyester Base Resin | 10.00 | — |
| Vinyl Toluene | — | 1.25 |
| Methacrylic Acid | 0.75 | 1.75 |
| Dibutyl Phthalate | 1.00 | 2.30 |
| HET | 0.39 | 0.30 |
| 1,4-Naphthoquinone | 0.003 | — |
| 5% EDTA Solution | 1.00 | 1.00 |
| Fumed Silica | 2.20 | 1.90 |
| Paraffin Wax | 0.50 | 0.70 |

The results labeled 20A and 21A were obtained when formulations 20 and 21 were mixed in ratio of 43:5 by weight with IPS Weld-On® SS 218 HVB activator, a proprietary curative paste containing 5.6 percent benzoyl peroxide by weight. Results 20B and 21B were obtained with an experimental curing paste containing 7.7 percent benzoyl peroxide. The cure state observations were made four hours after the achievement of peak exotherm.

| RESULTS | 20A | 20B | 21A | 21B |
|---|---|---|---|---|
| Cure behavior, 25 gram mass | | | | |
| Open working time, min. | 73.6 | 47.3 | 53.1 | 46.0 |
| Peak exotherm time, min. | 93.4 | 66.4 | 72.4 | 61.3 |
| Peak exotherm temp. ° F. | 216 | 242 | 244 | 268 |
| Thick bead cure results Bead dimensions 2 in × 6 in × 1.0 in thick | | | | |
| Surface boil observed | no | no | no | yes |
| Hardness, Shore D | 55 | 60 | 60 | 55 |
| Monomer odor | no | no | no | no |
| Thin film cure results Film dimensions 2 in × 6 in × 0.10 in thick | | | | |
| Surface boil observed | no | no | no | no |
| Hardness to touch | hard | hard | soft | hard |
| Monomer odor | no | no | yes | no |
| Tensile Properties ASTM D638 | | | | |
| Stress at Failure (psi) | | 3271 | | 2840 |
| Elongation (%) | | 198 | | 180 |

Example 22

Example 22 illustrates the improvement in adhesive bond strength at elevated temperature obtained with the addition of a vinyl ester resin. Example 22B, which contains 10 percent of a preferred vinyl ester resin, has more than twice the bond strength at 250° F. than comparative example 22A which contains no additive resin. The fiber tearing bond failure mode exhibited by Example 22B further illustrates the higher elevated temperature strength of the cured inventive adhesive formulation.

|  | ADHESIVES |  | ACTIVATOR |
| --- | --- | --- | --- |
| EXAMPLE | 22A | 22B | 22C |
| Tyrin 3615P | 12.00 | -------- | — |
| Hycar 1300 X33 | 2.00 | -------- | — |
| PARALOID BTA 753 | 17.50 | -------- | 12.00 |
| MMA Monomer | 58.80 | -------- | 55.75 |
| Methacrylic Acid | 6.00 | -------- | — |
| Paraffin Wax | 0.65 | -------- | 1.25 |
| Fumed Silica | 0.75 | -------- | — |
| Titanium Dioxide |  |  | 22.00 |
| MEKP | 0.75 | -------- | — |
| CHP | 0.75 | -------- | — |
| 2,4-Pentanedione | 0.80 | -------- | — |
| 12% Cobalt Octoate | — | — | 3.00 |
| DMPT | — | — | 6.00 |
| 1,4-Naphthoquinone | 0.005 | 0.005 | 0.01 |
| Total | 100.005 | 100.005 | 100.01 |
| BLENDED ADHESIVES |  |  |  |
| Grams of Adhesive | 100.00 | 90.00 |  |
| VE 9420 Vinyl Ester Resin | 0 | 10.00 |  |
| Grams of Activator | 10 | 10 |  |
| RESULTS |  |  |  |
| Lap Shear Strength |  |  |  |
| ASTM D5868 |  |  |  |
| Bond Strength at 250° F., psi | 125 | 270 |  |
| Failure Mode | CF(100%) | FT(50-100%) |  |

Example 23

Example 23 illustrates an inventive composition that is capable of bonding fiberglass panels with no observable print-through as well as bonding aluminum with no surface preparation. Adhesion to unprepared aluminum is achieved through the addition of a methacryloyloxyethyl phosphate ester.

| EXAMPLE | 23 |
| --- | --- |
| Neoprene AD-10 | 12.5 |
| Tyrin 3615P | 9.0 |
| Nipol DN 4555 | 4.0 |
| Flexible Orthophthalic Polyester Base Resin | 5.00 |
| Phosphate Ester | 1.20 |
| Methacrylic Acid | 5.00 |
| HP1310 Acrylic Oligomer | 3.80 |
| DMPT | 1.4 |
| 1,4-Naphthoquinone | 0.0035 |
| MMA Monomer | 53.06 |
| Paraloid BTA 753 | 5.00 |

The adhesive was mixed at a ratio of 8.3 to 1 by weight with Weld-On SS 605B activator, a proprietary paste containing 13.5 percent BPO by weight. Print through test was performed as in Example 18.

| RESULTS Peak Exotherm 10 Gram Mass |  |
| --- | --- |
| Open time, min. | 5.1 |
| Time to peak, min. | 9.4 |
| Temperature, ° F. | 229 |
| Print-Through | None observed |
| Lap Shear Strength, R.T. Aluminum, ASTM D1002 | 2638 psi, 100% CF |
| Lap Shear Strength, R.T. Aluminum/FRP, ASTM 5868 | 899 psi, 100% FT |

Although the present invention has been described with reference to the preferred embodiment, it will be appreciated that the description has been made for the purpose of understanding the present invention, and various changes and modifications can be made without departing from the scope of the invention.

The invention claimed is:

1. A polymerizable adhesive or filling composition for large assemblies comprising from about 5 to about 75 percent, by weight, of a thermoplastic or partially thermoplastic polymer or elastomer, from about 0.5 to about 35 percent, by weight, of a dicyclopentadiene resin and about 20 to about 80 percent of an alkyl acrylate or methacrylate monomer, wherein the thermoplastic or partially thermoplastic polymer or elastomer is crosslinked or partially crosslinked.

2. The polymerizable adhesive or filling composition of claim 1 wherein the thermoplastic or partially thermoplastic polymer comprises a core-shell polymer or impact modifier.

3. The polymerizable adhesive or filling composition of claim 1 wherein the thermoplastic or partially thermoplastic polymer comprises an elastomer or mixture of elastomers and a core-shell polymer or impact modifier.

4. The polymerizable adhesive or filling composition of claim 1 wherein the thermoplastic or partially thermoplastic polymer or elastomer is selected from the group consisting of a nitrile elastomer, a liquid nitrile polymer, a chlorinated polymer or elastomer, a polymer or copolymer of chloroprene, chlorinated polyethylene, chlorosulfonated polyethylene, epichlorohydrin polymers, polymers and copolymers of butadiene, isoprene and ethylene-propylene and ethylene-butylene with acrylonitrile and styrene, an acrylate or methacrylate polymer or copolymer, and mixtures of the above.

5. The polymerizable adhesive or filling composition of claim 1 wherein the alkyl acrylate or methacrylate monomers comprise a C1-C6 acrylate or methacrylate monomer selected from the group consisting of methyl methacrylate, ethyl methacrylate, hydroxyethyl methacrylate, propyl methacrylate, hydroxypropyl methacrylate, butyl methacrylate, hexamethyl methacrylate, hexyl methacrylate, cyclohexyl methacrylate, methyl, acrylate, ethyl acrylate hydroxyethyl acrylate, propyl acrylate, hydroxypropyl acrylate, butyl acrylate, hexyl acrylate, cyclohexyl methacrylate, or mixtures thereof.

6. The polymerizable adhesive or filling composition of claim 1 wherein the thermoplastic or partially thermoplastic polymer is selected from the group consisting of a blend of two or more thermoplastic or partially thermoplastic polymers, a blend of two or more elastomers, or at least one elastomer and at least one thermoplastic or partially thermoplastic polymer or mixtures thereof.

7. The polymerizable adhesive or filling composition of claim 2 wherein the core-shell polymer or impact modifier is selected from the group consisting of ABS, MABS, MBS, and or all-acrylic and mixtures thereof.

8. The polymerizable adhesive or filling composition of claim 1 wherein the thermoplastic polymer is selected from the group consisting of polystyrene and copolymers thereof, acrylic polymers and copolymers, polymers of acrylonitrile including styrene/acrylonitrile, ABS, and MABS, chlorinated polymers including polyvinyl chloride polymers and copolymers and mixtures of the above.

9. The polymerizable adhesive or filling composition of claim 3 wherein the elastomer or mixture of elastomers is selected from the group consisting of soluble or lightly crosslinked polychloroprene, chlorinated polyethylene, chlorosulfonated polyethylene, poly(epichlorohydrin), styrene-butadiene and styrene-isoprene polymers and block copolymers, soluble, lightly crosslinked or liquid polymers of acrylonitrile, butadiene and isoprene, acrylic elastomers, ethylene acrylic elastomers, and mixtures thereof.

10. The polymerizable adhesive or filling composition of claim 1 further comprising from about 0.01 to about 20 percent by weight of a polymerizable organic acid monomer or oligomer.

11. The polymerizable adhesive or filling composition of claim 10 wherein the polymerizable organic acid monomer comprises methacrylic acid or acrylic acid or mixtures thereof.

12. The polymerizable adhesive or filling composition of claim 10 wherein the polymerizable organic acid monomer is selected from the group consisting of maleic acid, fumaric acid, itaconic acid and mixtures thereof.

13. The polymerizable adhesive or filling composition of claim 10 wherein the polymerizable organic acid monomer or oligomer comprises a vinyl substituted phosphate ester.

14. The polymerizable adhesive or filling composition of claim 1 further comprising from about 0.1 to about 10 percent by weight of a viscosity control agent.

15. The polymerizable adhesive or filling composition of claim 1 further comprising one or more materials selected from the group consisting of catalysts, initiators, reducing agents, activators, and promoters and mixtures thereof.

16. The polymerizable adhesive or filling composition of claim 1 further comprising a chlorosulfonated polymer, an organic sulfonyl chloride and a dihydropyridine.

17. The polymerizable adhesive or filling composition of claim 1 further comprising a compound selected from the group consisting of a hydroperoxide, a dione or other chelator, an organometallic salt and an aromatic amine and combinations thereof.

18. The polymerizable adhesive or filling composition of claim 1 wherein the thermoplastic or partially thermoplastic polymer or elastomer is insoluble or only partially soluble in the monomer.

19. The polymerizable adhesive or filling composition of claim 1 wherein the thermoplastic or partially thermoplastic polymer or elastomer provides gel properties in the composition prior to curing.

20. The polymerizable adhesive or filling composition of claim 1 wherein the thermoplastic or partially thermoplastic polymer or elastomer is selected from the group consisting of diene polymers or copolymers, acrylic polymers or copolymers and chlorinated polymers and mixtures thereof.

21. A polymerizable adhesive or filling composition for large assemblies comprising from about 5 to about 75 percent, by weight, of a thermoplastic or partially thermoplastic polymer or elastomer, from about 0.5 to about 35 percent, by weight, of a dicyclopentadiene resin and about 20 to about 80 percent of an alkyl acrylate or methacrylate monomer, wherein the thermoplastic or partially thermoplastic polymer or elastomer is crosslinked or partially crosslinked, wherein at least one thermoplastic or partially thermoplastic polymer or elastomer is insoluble or only partially soluble in the monomer, wherein at least one thermoplastic or partially thermoplastic polymer or elastomer provides gel properties in the composition prior to curing, and wherein the thermoplastic or partially thermoplastic polymer or elastomer is selected from the group consisting of diene polymers or copolymers, acrylic polymers or copolymers and chlorinated polymers and mixtures thereof.

22. The polymerizable adhesive or filling composition of claim 21 further comprising at least 0.5 percent, by weight, of a polyester resins.

23. The polymerizable adhesive or filling Composition of claim 22 wherein the polyester resin is selected from the group consisting of orthophthalic, isophthalic, terephthalic, halogenated polyester resins and mixtures thereof.

24. The polymerizable adhesive or filling composition of claim 1 further comprising at least 0.5 percent, by weight, of a vinyl ester resin.

25. The polymerizable adhesive or filling composition of claim 1 further comprising at least 0.5 percent, by weight, of an orthophthalic resin.

* * * * *